UNITED STATES PATENT OFFICE 2,188,537

DI-BENZANTHRONE-ANTHRAQUINONE-DI-ACRIDINES

Donald P. Graham, Wilmington, Del., and Cullen G. Frey, West Chester, Pa., assignor to E. I. du Pont de Nemours & Company, Wilmington, Del., a corporation of Delaware No Drawing. Application December 16, 1938, Serial No. 246,175

4 Claims. (Cl. 260—274)

This invention relates to the preparation of new di-benzanthrone-anthraquinone-di-acridine dyestuffs. The invention has for its object the preparation of new dyestuffs of this series which dye in olive shades and which exhibit excellent fastness properties.

In U. S. Patent 995,936, the preparation of what are termed as green dyestuffs is described in which the condensation product of Bz-1-bromo-benzanthrone with 1-aminoanthraquinone is fused in alcoholic potash. Because of the desirable dyeing and fastness properties of this class of dyestuffs, many modifications and substitutions have been made in this molecule to obtain dyes of the same general series which dye in other shades.

We have found that new dyestuffs, which dye in desirable olive shades may be prepared by condensing 2 mols of 6-Bz-1-dibromo-benzanthrone with 1 mol of 1:4- or 1:5- or 1:8-diaminoanthraquinone, and then condensing this molecule with 2 mols of alpha-aminoanthraquinone. On the alkaline fusion, dyestuffs are obtained which are diacridino-anthraquinone compounds of the general formula:

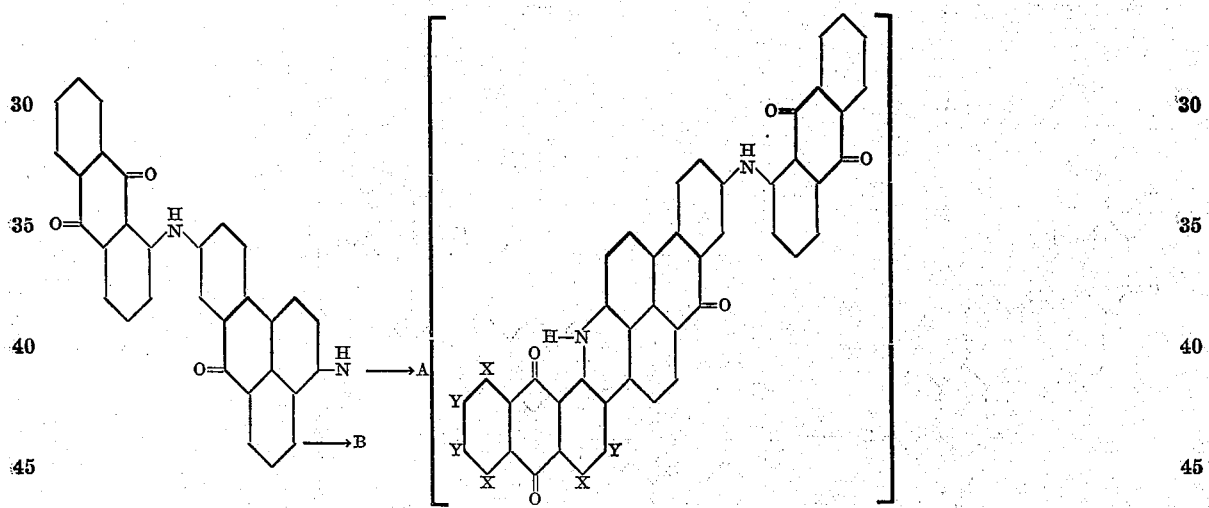

in which linkage A is attached to one X and linkage B to the adjacent Y, and the remaining X's and Y's represent hydrogen.

Although it cannot be definitely proved whether the end anthrimide groups are ring-closed or not ring-closed in the alkali fusion, for the purpose of this description it is believed that the above formula is sufficiently accurate to be used to identify applicants' new dyestuffs, and it is to be understood that in the claims the formulae are used to identify the products that are actually produced by the processes of the examples.

The condensation of the bromo-benzanthrone and the aminoanthraquinone molecules is carried out by the usual and well known Ullmann reaction in an inert organic solvent and in the presence of an acid binding agent and copper catalyst. The ring-closure of the anthrimide type compounds to the acridine may be effected by the alkaline condensation agents usually employed in the preparation of benzanthrone-anthraquinone-acridines.

These dyes may be converted to the leuco sulfuric acid esters by the usual methods.

The following examples are given to illustrate the invention. The parts used are by weight.

Example 1

24 parts of 1:5-diaminoanthraquinone, 80 parts of 6-Bz-1-dibromo-benzanthrone, 50 parts of soda ash, 6 parts of copper acetate, and 0.6 part of copper powder are slurried in 1200 parts of nitrobenzene. The charge is heated under reflux (200–210° C.) for 3 hours. It is then cooled to a point appreciably below the reflux temperature. 46 parts of 1-aminoanthraquinone, 30 parts of soda ash, 1 part of copper acetate, and 0.1 part of copper powder are then added to the charge. The mass is heated to 200–210° C. for 10 to 15 hours, cooled to 80° C. and filtered. The cake is washed with a small quantity of nitrobenzene, sucked dry and subjected to steam distillation until free of solvent. The resulting anthrimide is filtered off, washed with water, and dried. The yield is essentially quantitative.

An alcoholic potassium hydroxide melt is prepared using 1150 parts of ethyl alcohol and 1150 parts of potassium hydroxide. The melt is heated to 130° C., cooled to 120° C. and 115 parts of anthrimide (prepared as described in the preceding paragraph) are added. The melt is heated slowly to 150° C. (allowing some alcohol to distill off) and is held at 145–155° C. for 3 to 4 hours. The charge is then drowned in 6000 parts of water and oxidized by aeration or by the addition of an oxidizing agent until all the color has been precipitated. The crude color is filtered off, washed alkali free and dried. The yield of crude color is approximately quantitative. 100 parts of the above product are dissolved in 2000 parts of 96% sulfuric acid at 5° C. ± 2°, drowned in a large volume of cold water, filtered, and washed acid free. The color value is then adjusted to the desired strength and standardized. This final product is a dark olive colored paste. The product dissolves in concentrated sulfuric acid with a green color and gives a black vat from which cotton is dyed in olive shades of excellent general fastness properties.

*Example 2*

When 1:4-diaminoanthraquinone or 1:8-diaminoanthraquinone is substituted for 1:5-diaminoanthraquinone in the preceding example, an isomeric product is obtained which is very similar in dyeing properties.

We claim:
1. The dyestuffs resulting from the caustic alkali condensation of the products of the following general formula:

in which linkage A is attached to one of the X positions and the remaining X's represent hydrogen, which dyestuffs dye cotton from a black vat in olive shades of excellent general fastness properties.

2. The dyestuff resulting from the caustic alkali condensation of the product of the formula:

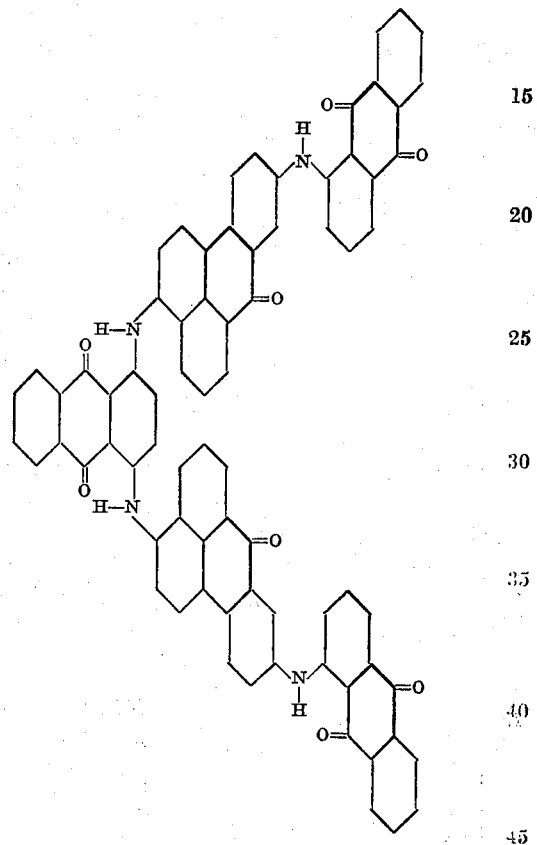

which dyestuff dyes cotton from a black vat in olive shades of excellent general fastness properties.

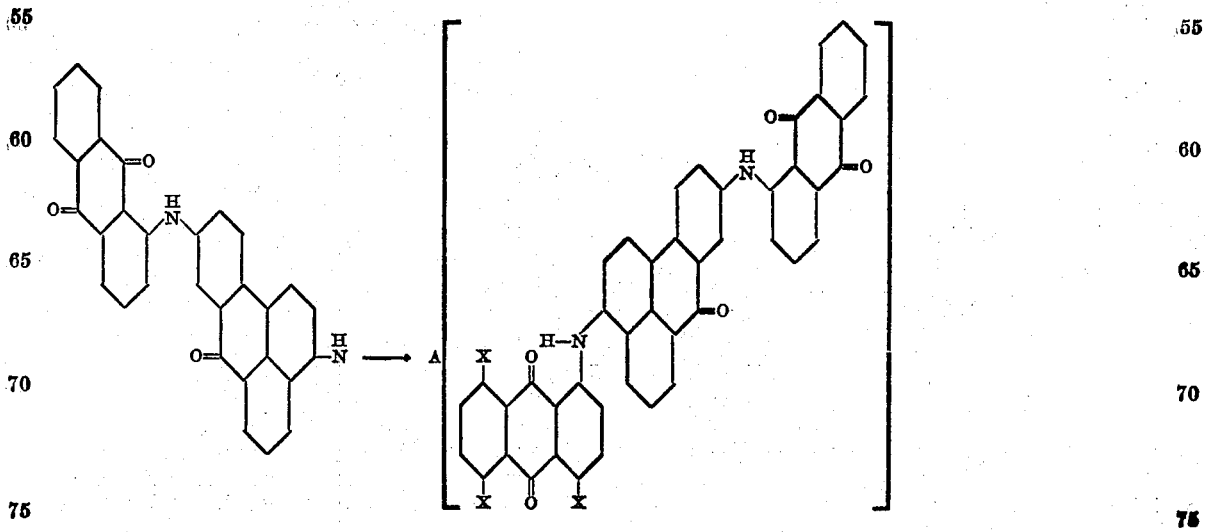

3. The dyestuff resulting from the caustic alkali condensation of the product of the formula:

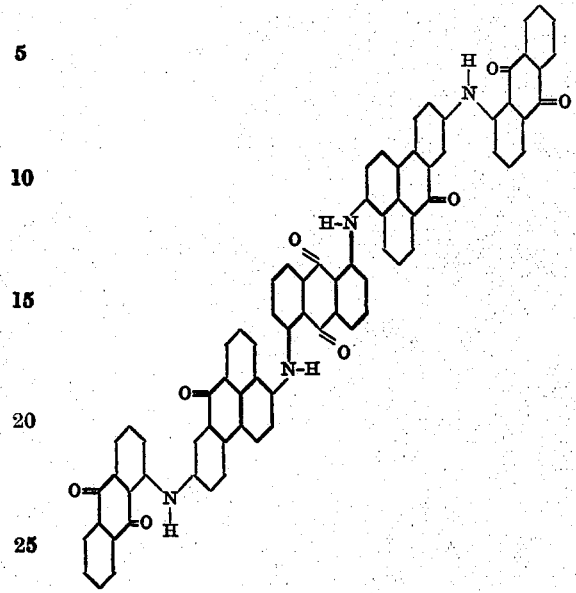

4. The dyestuff resulting from the caustic alkali condensation of the product of the formula:

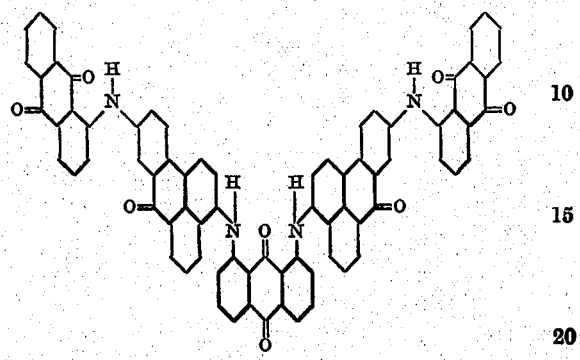

which dyestuff dyes cotton from a black vat in olive shades of excellent general fastness properties.

which dyestuff dyes cotton from a black vat in olive shades of excellent general fastness properties.

DONALD P. GRAHAM.
CULLEN G. FREY.